(12) United States Patent
Stamps et al.

(10) Patent No.: US 8,356,768 B2
(45) Date of Patent: *Jan. 22, 2013

(54) MULTIPLE DRIVE-PATH TRANSMISSION WITH TORQUE-SPLITTING DIFFERENTIAL MECHANISM

(75) Inventors: Frank B. Stamps, Colleyville, TX (US); Dudley Smith, Arlington, TX (US); Charles J. Kilmain, Fort Worth, TX (US); Ryan Ehinger, Irving, TX (US); Bob Collins, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,880

(22) Filed: Mar. 26, 2012

(65) Prior Publication Data

US 2012/0180597 A1    Jul. 19, 2012

Related U.S. Application Data

(63) Continuation of application No. 12/446,396, filed as application No. PCT/US2006/044186 on Nov. 14, 2006, now Pat. No. 8,141,812.

(51) Int. Cl.
*B64C 27/08* (2006.01)

(52) U.S. Cl. .................................. 244/17.23

(58) Field of Classification Search ............. 244/17.11, 244/17.19, 17.21, 17.23
See application file for complete search history.

(56) References Cited

U.S. PATENT DOCUMENTS

| | | | |
|---|---|---|---|
| 2,966,806 A | | 7/1958 | Luning |
| 4,272,041 A * | | 6/1981 | Mabuchi et al. ............ 244/17.21 |
| 4,407,598 A * | | 10/1983 | Hendershot ..................... 403/4 |
| 4,515,495 A * | | 5/1985 | Trouillet ........................ 403/336 |
| 4,729,753 A * | | 3/1988 | Neathery et al. ............... 464/71 |
| 5,117,704 A * | | 6/1992 | Kish et al. ...................... 74/411 |
| 5,135,442 A * | | 8/1992 | Bossler, Jr. ..................... 475/1 |
| 5,528,960 A * | | 6/1996 | Nagao et al. ............. 74/665 GD |
| 5,813,292 A * | | 9/1998 | Kish et al. ................... 74/665 C |
| 6,364,611 B1 * | | 4/2002 | Matsuda et al. ........... 416/170 R |
| 6,712,313 B2 | | 3/2004 | Zoppitelli et al. |
| 7,467,566 B2 * | | 12/2008 | Clement ......................... 74/409 |
| 8,141,812 B2 * | | 3/2012 | Stamps et al. ............. 244/17.23 |
| 2005/0109144 A1 | | 5/2005 | Clement |

OTHER PUBLICATIONS

Canadian Office Action dated Mar. 29, 2012 from counterpart application No. 2,667,607.
Canadian Examination Report in related Canadian Application No. 2,667,607 issued by Canadian Intellectual Property Office on Jun. 22, 2011, 3 pages.
Chinese First Office Action in related Chinese Application No. 200680056388.0, by Chinese Patent Office on Jul. 29, 2011.
PCT Search Report and Written Opinion in Parent PCT Application No. PCT/US06/44186, dated Jul. 25, 2008, 9 pages.

(Continued)

*Primary Examiner* — Tien Dinh
*Assistant Examiner* — Keith L Dixon
(74) *Attorney, Agent, or Firm* — James E. Walton; Richard G. Eldredge

(57) ABSTRACT

A transmission for a rotary-wing aircraft has a differential torque-splitting mechanism associated with an input shaft. The differential has a drive disk coaxial with the shaft and integral in rotation with the shaft, a first driven member coaxial with the shaft and generally adjacent the drive disk, and a second driven member coaxial with the shaft and generally adjacent the drive disk. At least one pin engages each of the drive disk, the first driven member, and the second driven member. The first driven member is configured to drive a first transfer gear, and the second driven member is configured to drive a second transfer gear for supplying torque to a bull gear associated with a rotor mast.

20 Claims, 12 Drawing Sheets

OTHER PUBLICATIONS

PCT International Preliminary Report on Patentability in Parent PCT Application No. PCT/US06/44186, dated Jun. 9, 2009, 8 pages.
Office Action in Related U.S. Appl. No. 12/446,396, dated Aug. 4, 2011, 8 pages.
Notice of Allowance in Related U.S. Appl. No. 12/446,396, dated Nov. 25, 2011, 5 pages.
Chinese Examination Report dated May 4, 2012 from counterpart CN Application No. 200680056388.0.

* cited by examiner

MULTIPLE DRIVE-PATH TRANSMISSION WITH TORQUE-SPLITTING DIFFERENTIAL MECHANISM

CROSS-REFERENCE TO RELATED APPLICATIONS

This application is a Continuation of U.S. application Ser. No. 12/446,396, filed on 20 Apr. 2009, titled "Multiple Drive-Path Transmission with Torque-Splitting Differential Mechanism", which was the National Stage of International Application No. PCT/US06/44186, filed on 14 Nov. 2006, titled "Multiple Drive-Path Transmission with Torque-Splitting Differential Mechanism", both of which are hereby incorporated by reference for all purposes as if fully set forth herein.

BACKGROUND

1. Technical Field

The present invention relates generally to the field of rotary-wing aircraft and more particularly to the field of power transmissions for rotary-wing aircraft.

2. Description of Related Art

The driveshaft, or mast, of a rotary-wing aircraft is typically outfitted with a means for carrying rotor blades in a manner such that the rotor blades are capable of selectively producing lift when the mast is rotated. Of the rich variety of means known for transferring torque to a mast, a common configuration is to associate the mast with a single large bull gear (either by connecting the bull gear to the mast with splines or by forming the bull gear integrally with the mast) and driving the bull gear with a transfer gear. While this configuration is common, it remains fraught with a number of unfortunate design limitations.

More specifically, while it is often desirable to drive a mast with high torque, the size and/or weight of a bull gear capable of transmitting the high torque over a sufficiently long period of time may prove to be a significant limiting factor. As with other gears, a design concern with bull gears is gear tooth bending, which is a common mode of failure in bull gears. As a bull gear is driven by a transfer gear, the teeth of the transfer gear transmit force from the faces of the teeth of the transfer gear to the faces of the teeth of the bull gear. If there is only one transfer gear driving the bull gear, each tooth of the bull gear is said to undergo one bending cycle per revolution of the bull gear. Since the bending force endured by each individual tooth of the bull gear is a determining factor of when gear tooth failure of the bull gear teeth will occur, it is desirable to keep the bending force as low as possible. Prevention of gear tooth failure is imperative because failure of a bull gear may lead to a catastrophic rotary-wing aircraft failure.

In attempts to reduce the bending force applied to the teeth of bull gears, some have driven the bull gear by splitting the torque and delivering the torque to the bull gear with multiple transfer gears. For example, by driving a bull gear with two identical transfer gears, the nominal bending force applied to the teeth of the bull gear would typically be reduced by one-half as compared to the force when using only one transfer gear. This is a seemingly elegant solution, but in practice, a number of problems occur in implementing the solution. First, it is important to note that each discrete drive path in the above described configuration has an inherent natural frequency at which the transmission must be prevented from oscillating. Also, as is easily recognized by those of ordinary skill in evaluating system dynamics, other modes of vibration and composite natural frequencies related to the interaction of the two independent drive paths exist. Oscillation at each of the other composite natural frequencies must also be avoided during operation of the transmission.

Further, previous attempts at driving a bull gear with multiple inputs were troubled by less than optimal distribution of torque between the multiple drive paths and the force fights which occur between the two drive paths when a phase difference or lead/lag situation occurs between the drive paths. For the two drive-path configuration as described above, any inconsistencies in the meshing of the first transfer gear to the bull gear (whether caused by debris, inconsistent tooth wear, etc.) would transmit force back through the first drive path to the torque splitting device and ultimately through the second drive path to the second transfer gear. The second transfer gear then transmits an atypical force to the teeth of the bull gear. Since the atypical forces transferred to the teeth of the bull gear may easily be of very high magnitude (at least higher than the force normally transferred to the teeth of the bull gear in a single transfer gear configuration), this force fighting is incompatible with the goal of reducing the forces transmitted to the teeth of the bull gear.

While the torque transfer mechanisms described above represent significant developments in transmitting torque to a bull gear, considerable shortcomings remain.

SUMMARY OF THE INVENTION

There is a need for a means for transmitting torque to a bull gear in a manner which allows for the use of a reduced size and/or weight bull gear.

Therefore, it is an object of the present invention to provide a means for transmitting torque to a bull gear in a manner which allows for the use of a reduced size and/or weight bull gear.

This object is achieved by providing a transmission having multiple drive paths for transferring torque to a bull gear and a differential means splitting the torque and transferring the torque into the multiple drive paths.

A transmission for a rotary-wing aircraft has a differential torque-splitting mechanism associated with an input shaft. The differential has a drive disk coaxial with the shaft and integral in rotation with the shaft, a first driven member coaxial with the shaft and generally adjacent the drive disk, and a second driven member coaxial with the shaft and generally adjacent the drive disk. At least one pin engages each of the drive disk, the first driven member, and the second driven member. The first driven member is configured to drive a first transfer gear, and the second driven member is configured to drive a second transfer gear for supplying torque to a bull gear associated with a rotor mast.

The present invention provides significant advantages, including: (1) providing a low-cost and low-weight means for reducing gear tooth bending forces acting on the teeth of a bull gear; (2) reducing the weight and/or size of a bull gear; and (3) providing multiple inputs to a single bull gear while avoiding force fights among the multiple force paths and while allowing phase differences and/or lead/lag between multiple input gears.

Additional objectives, features, and advantages will be apparent in the written description that follows.

DESCRIPTION OF THE DRAWINGS

The novel features believed to be characteristic of the invention are set forth in the appended claims. However, the invention itself, as well as a preferred mode of use and further objectives and advantages thereof, will best be understood by reference to the following detailed description when read in conjunction with the accompanying drawings, wherein:

DETAILED DESCRIPTION OF THE PREFERRED EMBODIMENT

The present invention represents the discovery that a torque-splitting differential mechanism can be advantageously used to deliver torque through multiple drive paths to a bull gear. While specific reference is made to using the present invention with tiltrotor rotary-wing aircraft, the transmission of the present invention may alternatively be used to transfer torque in any appropriate type of application.

Figure 1:
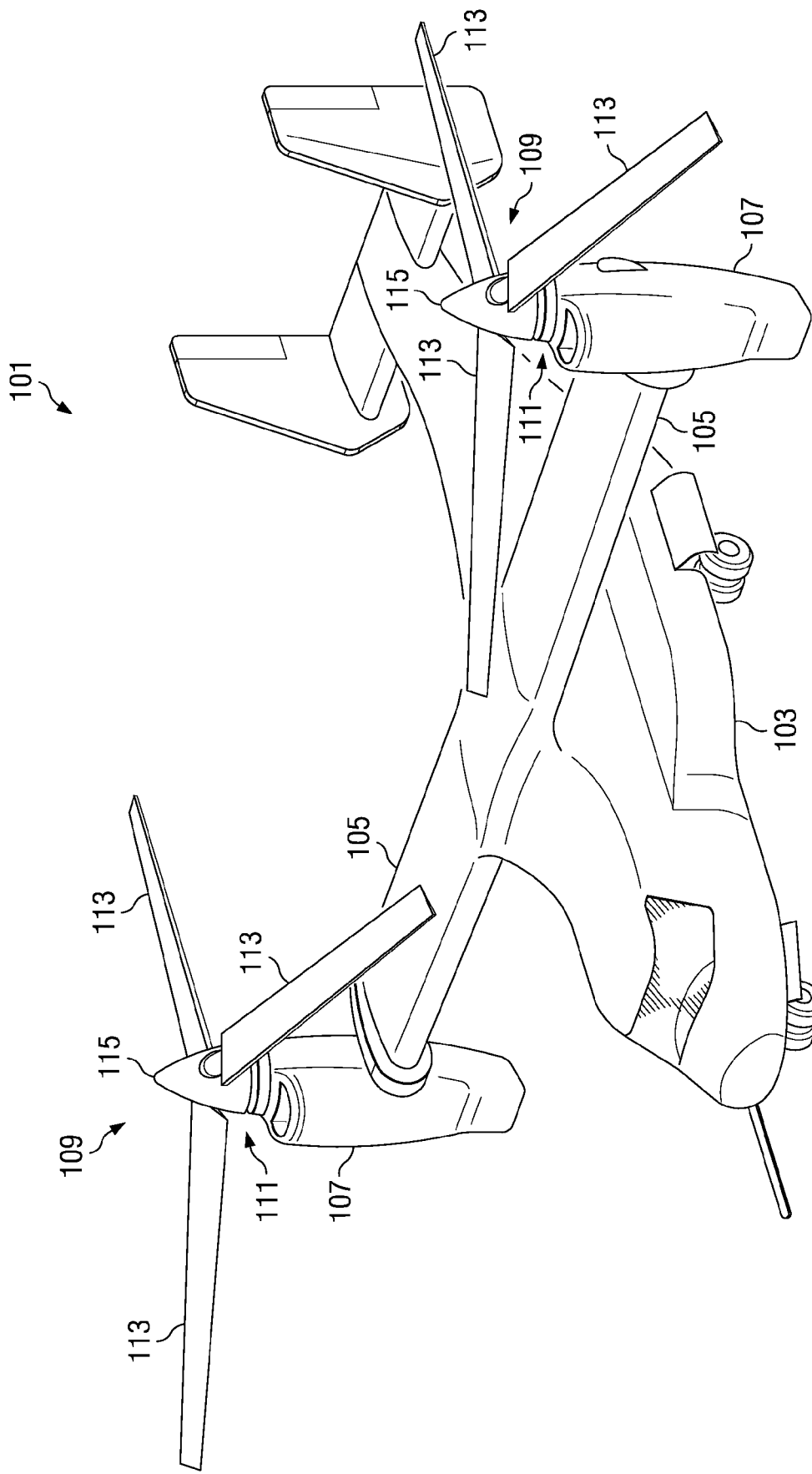
FIG. 1 is an oblique view of a tiltrotor aircraft having the transmission of the present invention.
Figure 2:
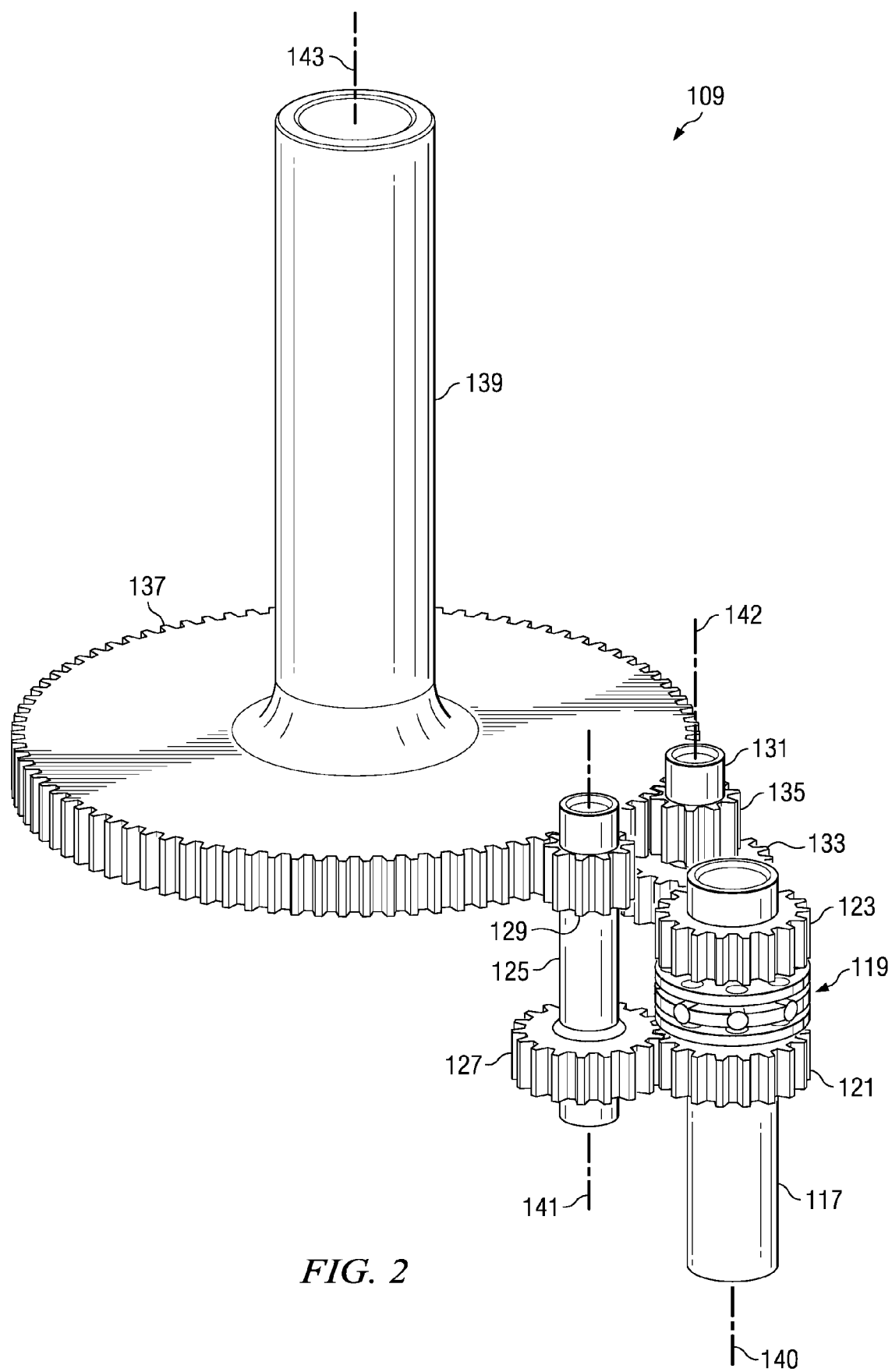
FIG. 2 is an oblique view of the transmission according to the preferred embodiment of the present invention.
Figure 3:
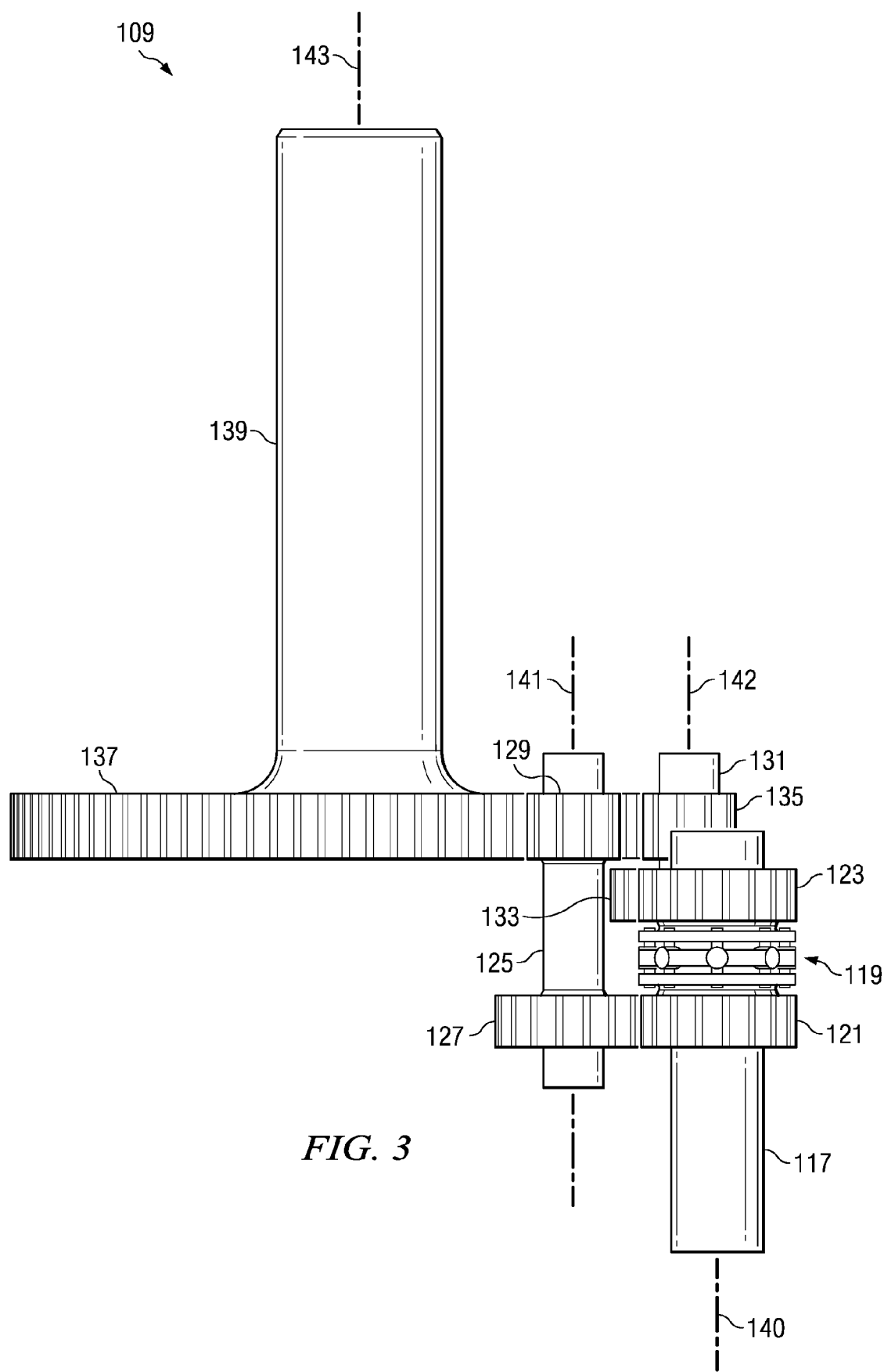
FIG. 3 is a side view of the transmission of FIG. 2.
Figure 4:
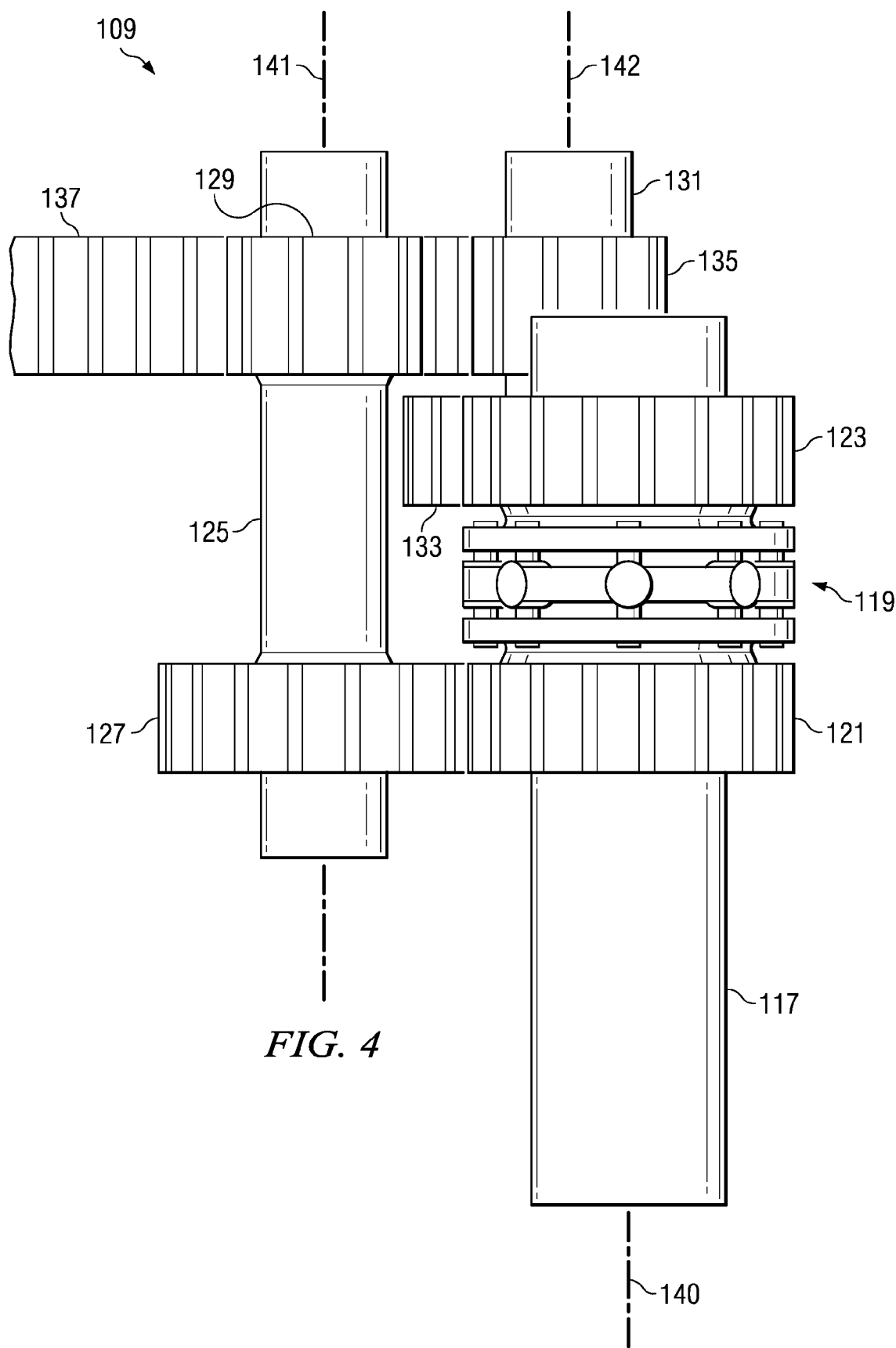
FIG. 4 is a side view of a portion of the transmission of FIG. 2.
Figure 5:
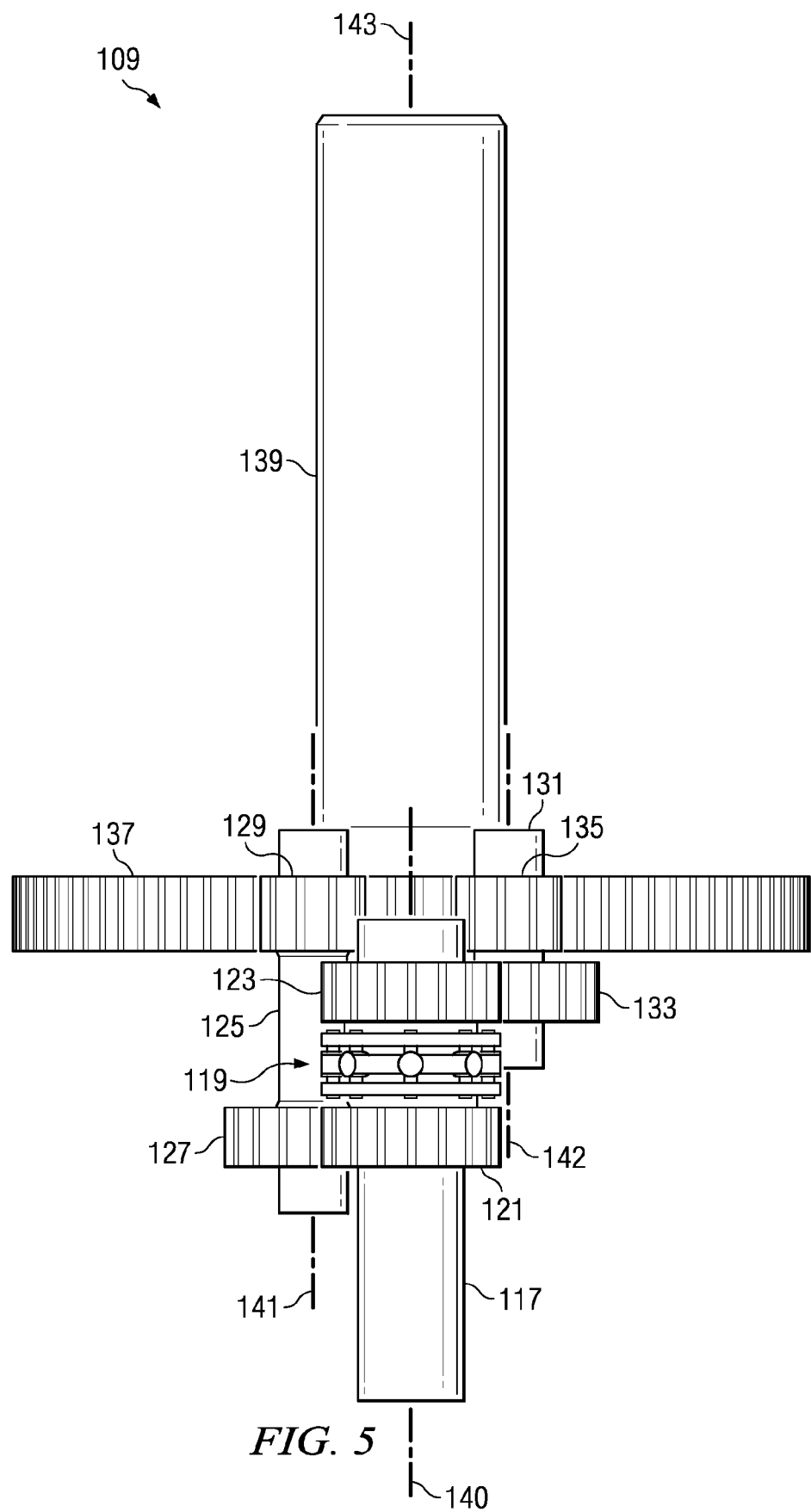
FIG. 5 is a side view of the transmission of FIG. 2.

FIG. 1 depicts a tiltrotor rotary-wing aircraft incorporating the transmission of the present invention. FIG. 1 illustrates a tiltrotor aircraft 101 in a helicopter mode of flight operation. Aircraft 101 comprises a fuselage 103 with attached wings 105. Nacelles 107 are carried at the outboard ends of wings 105 and are rotatable between the helicopter-mode position shown and a forward-facing airplane-mode position (not shown). Nacelles 107 carry engines and transmissions 109 for powering rotor systems 111 in rotation. It will be appreciated that an engine may be an internal combustion engine, an electrical power source and associated motor, or any other suitable means for powering rotor system 111. Each rotor system 111 is illustrated as having three blades 113. Spinning covers 115 and nacelles 107 substantially enclose transmission 109, obscuring transmission 109 from view in FIG. 1.

Referring now to FIGS. 2 through 5 in the drawings, a transmission according to the present invention is illustrated. Transmission 109 generally comprises an input shaft 117, a torque-splitting differential mechanism 119 (hereinafter referred to as a differential 119), a lower drive gear 121, an upper drive gear 123, an intermediate shaft 125 having an input gear 127 and an output gear 129, an intermediate shaft 131 having an input gear 133 and an output gear 135, and a bull gear 137, which may be attached to a mast 139 or formed integrally therewith. Gears 127, 129, 133, 135 may be formed as integral components of their associated shaft 125, 131, or gears 127, 129, 133, 135 may be formed as separate components and affixed to shafts 125, 131. Shaft 117 and gears 121, 123 rotate about axis 140, shaft 125 and gears 127, 129 rotate about axis 141, shaft 131 and gears 133, 135 rotate about axis 142, and bull gear 137 and the attached mast 139 rotate about axis 143. Gears 121, 123, 127, 129, 133, 135, 137 are shown as straight-cut gears, though other types of gears, such as bevel-but gears, may be used. While axes 140, 141, 142, 143 are shown as parallel, use of other types of gears 121, 123, 127, 129, 133, 135, 137 can allow for one or more of axes 140, 141, 142, 143 to be at an angle relative to the others. Each of gears 121, 123, 127, 129, 133, 135, 137 and shafts 117, 125, and 131 are preferably constructed of metal, though these may optionally be constructed of any other suitable material or combination of materials.

In operation, shaft 117 is driven in rotation about axis 140 either directly by an engine (not shown) or by a drivetrain (not shown) which joins the engine to transmission 109. Transmission 109 is configured to provide two paths for the transfer of torque from input shaft 117 to bull gear 137. Torque is transferred from shaft 117 to differential 119 (described in detail below), which splits the torque and transfers the torque components to lower drive gear 121 and upper drive gear 123. A first torque path transfers torque from drive gear 121 to input gear 127 on shaft 125, and then through shaft 125 into output gear 129, which transfers the torque to bull gear 137. A second torque path transfers torque from drive gear 123 to input gear 133 on shaft 131, and then through shaft 131 into output gear 135, which transfers the torque to bull gear 137. Thus, transmission 109 has a "2-into-1" configuration, in which one input shaft 117 drives two output gears 129, 135.

Figure 6:
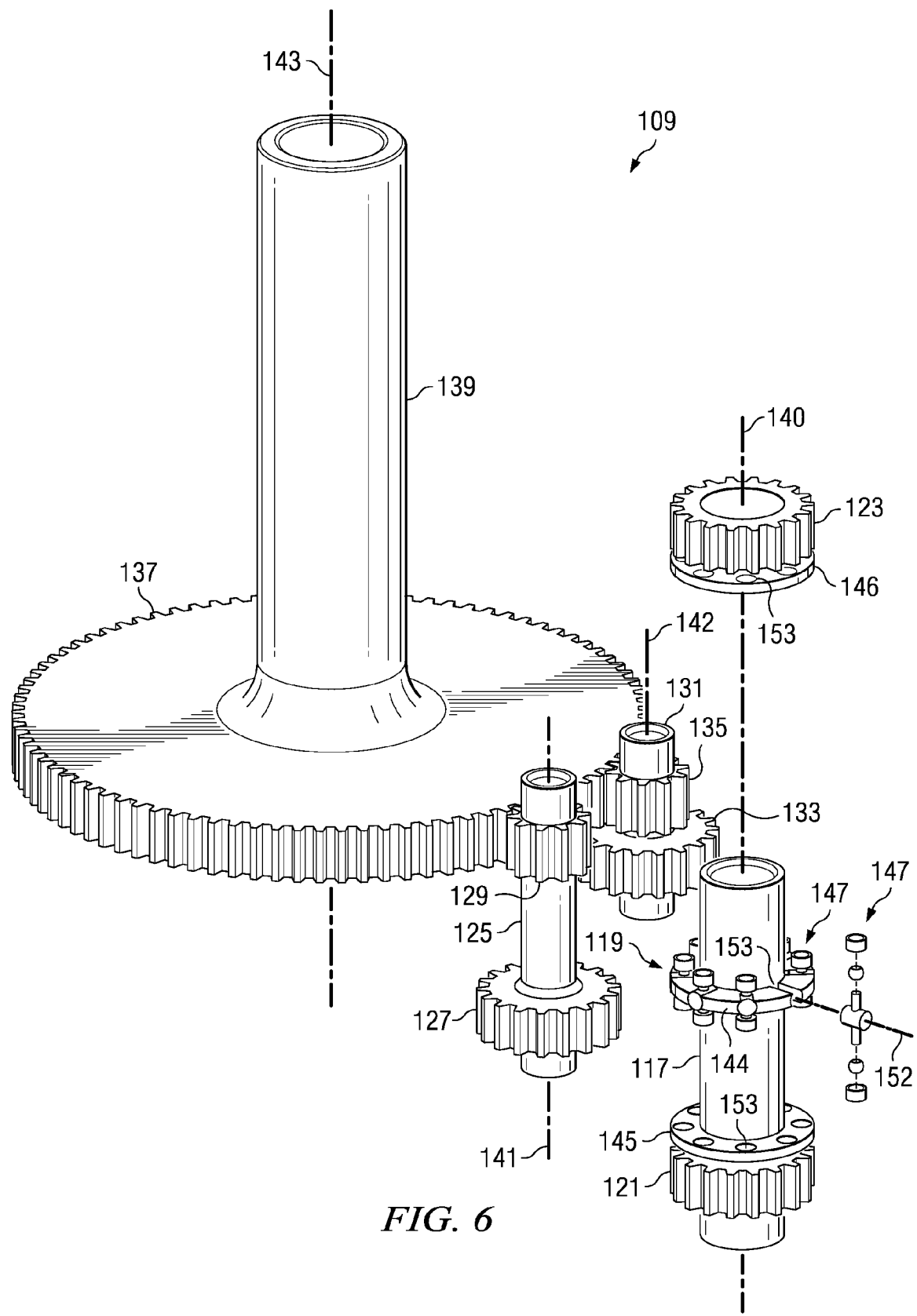
FIG. 6 is an oblique, partially exploded view of the transmission of FIG. 2.
Figure 7:
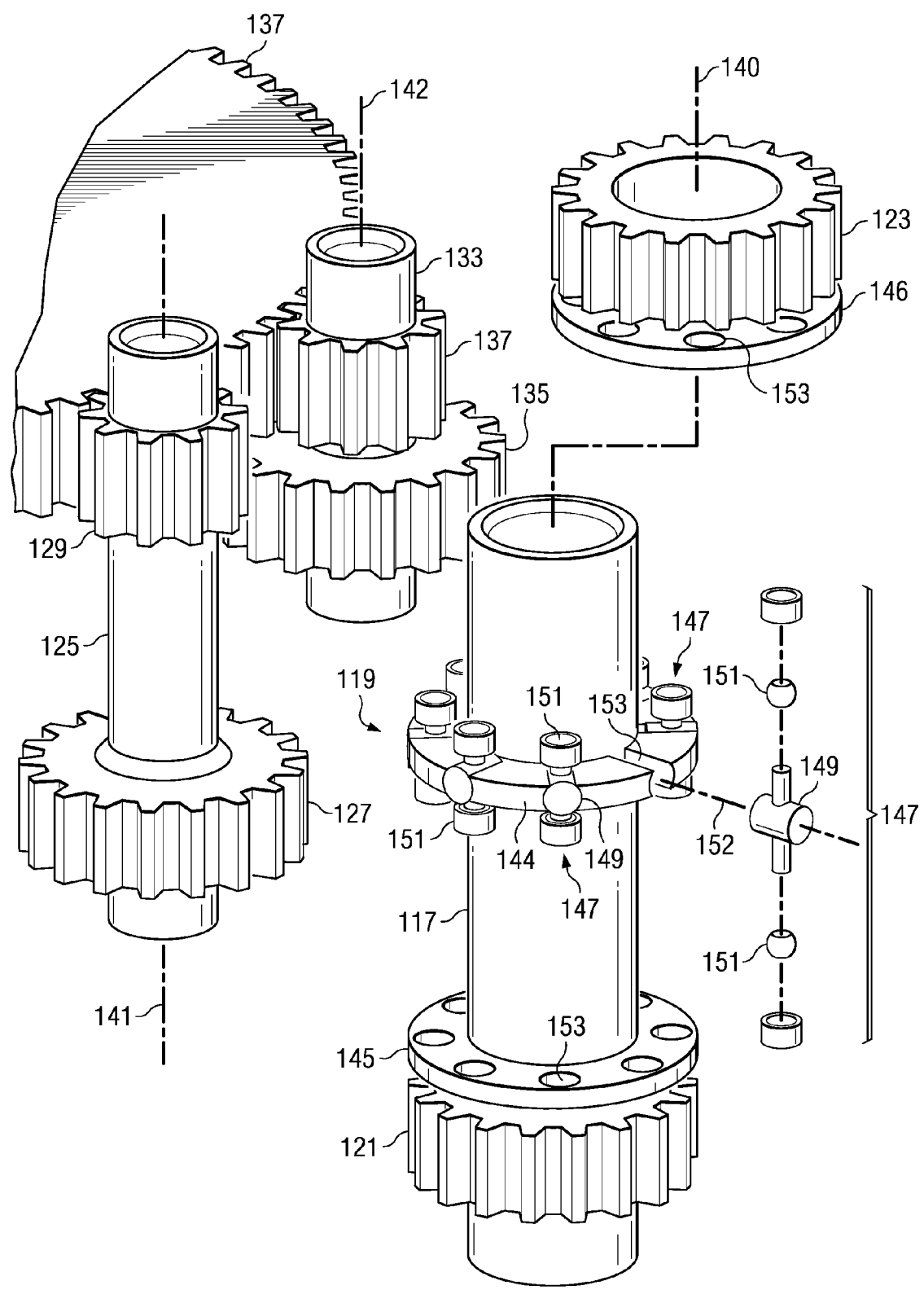
FIG. 7 is an enlarged, oblique, partially exploded view of a portion of the transmission of FIG. 2.

Referring now to FIGS. 6 and 7 in the drawings, the transmission according to the present invention is shown with a partially exploded view of differential 119. Differential 119 comprises a central driving disk 144 adapted to be integral in rotation with shaft 117 about axis 140. Driving disk 144 is preferably integrally formed with shaft 117; however, disk 144 may alternatively be splined to or otherwise attached to shaft 117. Differential 119 further comprises two driven disks 145, 146, which cooperate with central driving disk 144 through the use of triple-joint pins 147. Triple-joint pins 147 allow for relative rotation about axis 140 between driven disks 145, 146. Driven disks 145, 146 are configured to rotate drive gears 121, 123, respectively, about axis 140.

Triple-joint pins 147 each comprise three joints: a central cylindrical joint 149 and two ball joints 151 (some not labeled for clarity). Each central cylindrical joint 149 is associated with central driving disk 144, and each ball joint 151 is associated with one of driven disks 145, 146. Cylindrical joint 149 is arranged coaxially with an axis 152, which is substantially perpendicular to axis 140. Triple-joint pins 147 are preferably oriented such that each axis 152 extends generally radially from axis 140. This configuration advantageously allows for triple-joint pin 147 to translate along axis 152 and rotate about axis 152. Central driving disk 144 and driven disks 145, 146 each comprise appropriately sized and shaped receptacles 153 for receiving joints 149, 151 of triple-joint pins 147, as described above. Other necessary bearings, axial preload devices, bushings, and/or interface components are integrated into differential 119 as necessary, the integration of which is known to those ordinarily skilled in the art, and these additional components may be applied to the current embodiment in light of the present teachings.

While triple-joint pins 147 are described as comprising a central cylindrical joint 149 and two end ball joints 151, it will be appreciated that, in alternative embodiments of the present invention, the triple-joint action of pins 147 may be retained even while replacing the central cylindrical joint 149 with a ball joint 151. Further within the scope of the present invention is an embodiment having triple-joint pins comprising three cylindrical joints 149 and no ball joints 151.

In another alternate embodiment of the present invention (not shown), the torque-splitting differential mechanism 119 may be adapted to provide unequal torque output to driven disks 145, 146. Unequal torque splitting may be accomplished by providing unequal distances between each of driven disks 145, 146 and central driving disk 144. For example, if the distance between central driving disk 144 and driven disk 145 is equal to twice the distance between central driving disk 144 and driven disk 146, differential 119 will transfer more torque to driven disk 145. Hence, more torque would ultimately be transferred to bull gear 137 by output gear 129 than by output gear 135. The number of differentials connected within each drive path can be an even or an odd number, with an unequal number of torque splits in the drive paths resulting in unequal torque application through the drive paths.

In addition to the embodiments shown, in which only one torque-splitting differential is shown, more than one differential may be used to create additional torque paths from one or more torque inputs to one or more bull gears. FIGS. 8 through 12 show examples of various combinations of numbers of inputs and outputs.

Figure 8:
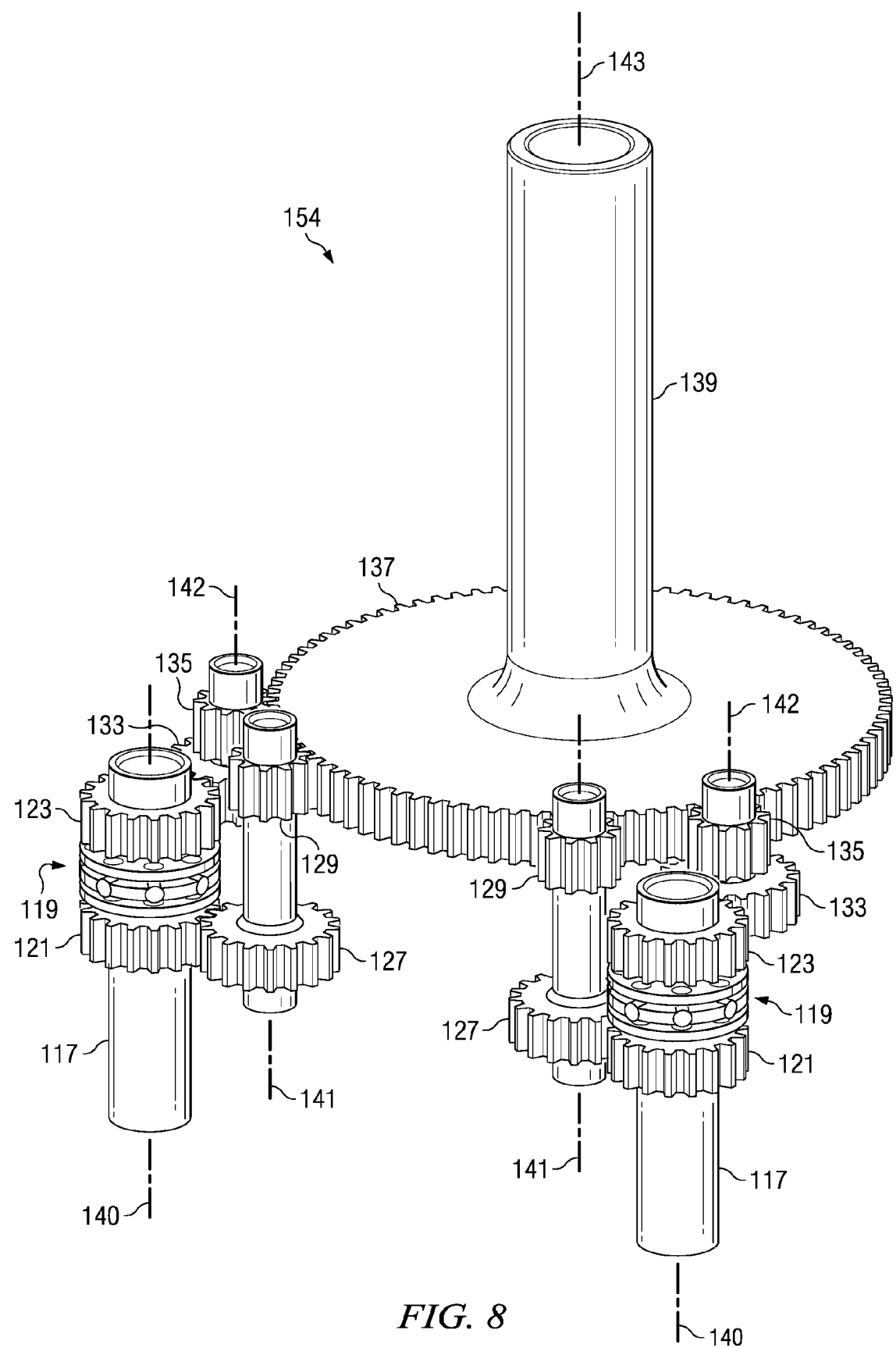
FIG. 8 is an oblique view of an alternative embodiment of the transmission according to the present invention.

FIG. 8 shows a transmission 154 according to the present invention, transmission being constructed similarly to transmission 109, described above. Transmission 154 has a 2-into-4 configuration that features two torque input shafts 117 and two pair of output gears 129, 135, each pair of output gears 129, 135 being driven by one of input shafts 117. Gears 129, 135 engage bull gear 137 for causing rotation of mast 139.

Figure 9:
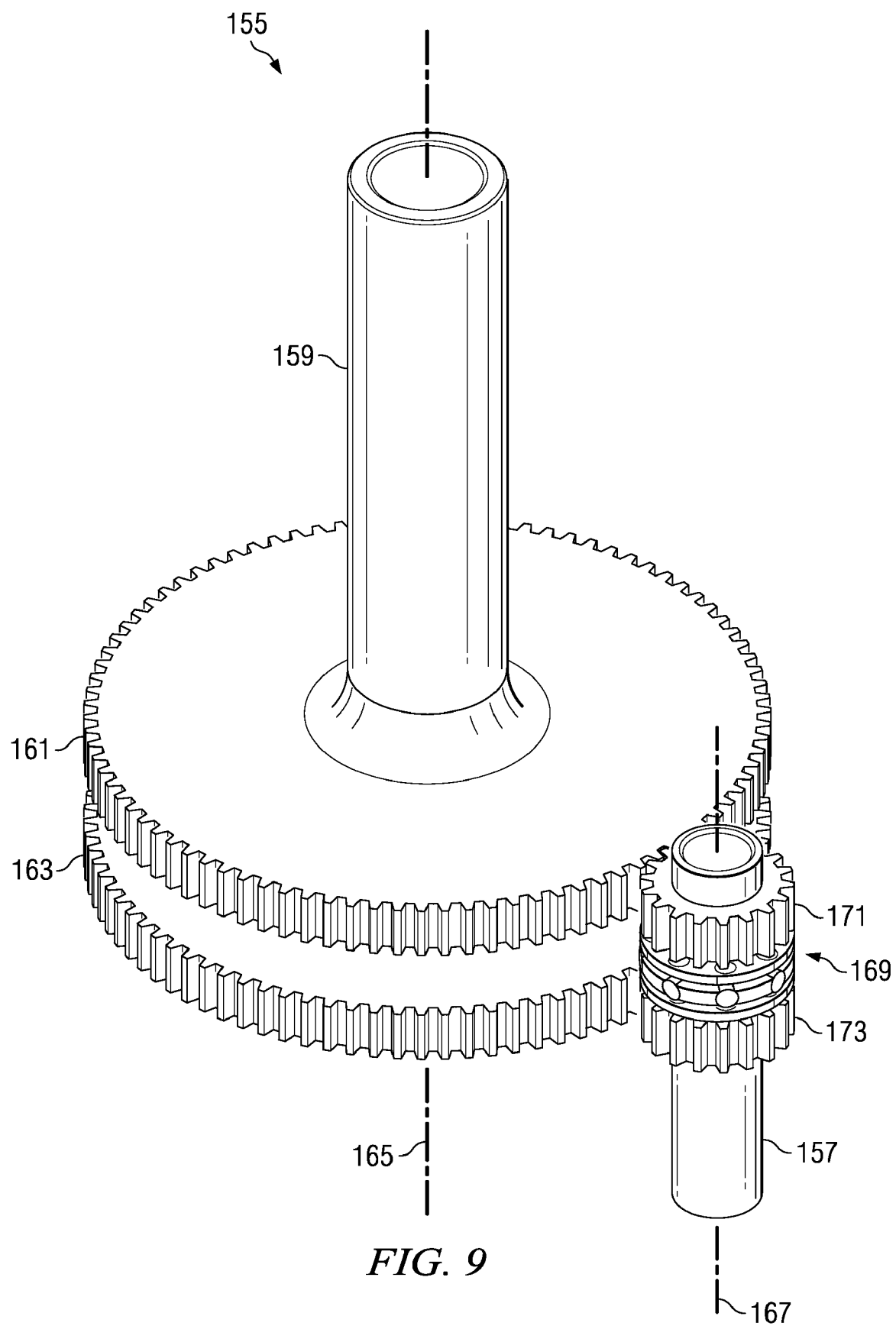
FIG. 9 is an oblique view of an alternative embodiment of the transmission according to the present invention.

FIG. 9 shows a transmission 155 according to the present invention, in which torque is transferred from input shaft 157 to a mast 159. This configuration provides a 1-into-2 torque path that features a single input and two output gears that engage mast 159. Mast 159 has two integral bull gears 161, 163 and rotates about axis 165. Input shaft 157 rotates about axis 167 and drives a differential 169, which is constructed similarly to differential 119, described above. Each side of differential 169 is connected to an output gear 171, 173, which engages one of bull gears 161, 163 for transferring torque into bull gears 161, 163 for causing rotation of mast 159.

Figure 10:
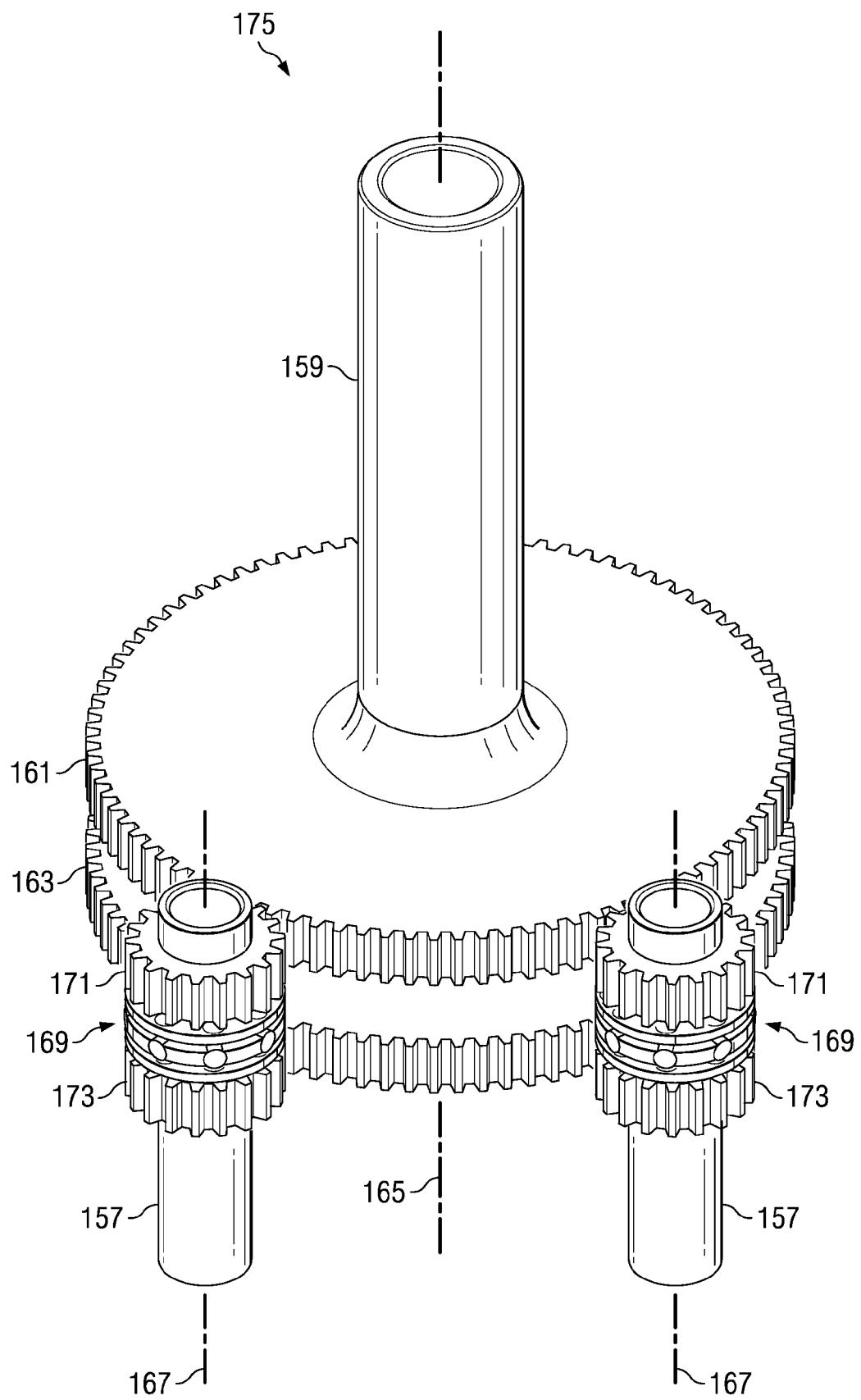
FIG. 10 is an oblique view of an alternative embodiment of the transmission according to the present invention.

Transmission 175, shown in FIG. 10, uses the same components and torque paths as transmission 155 for providing a 2-into-4 configuration. Transmission 175 comprises a pair of input shafts 157, and each input shaft 157 drives a pair of output gears 171, 173 with a differential 169. Both output gears 171 engage bull gear 161, and both output gears 173 engage bull gear 163.

Figure 11:
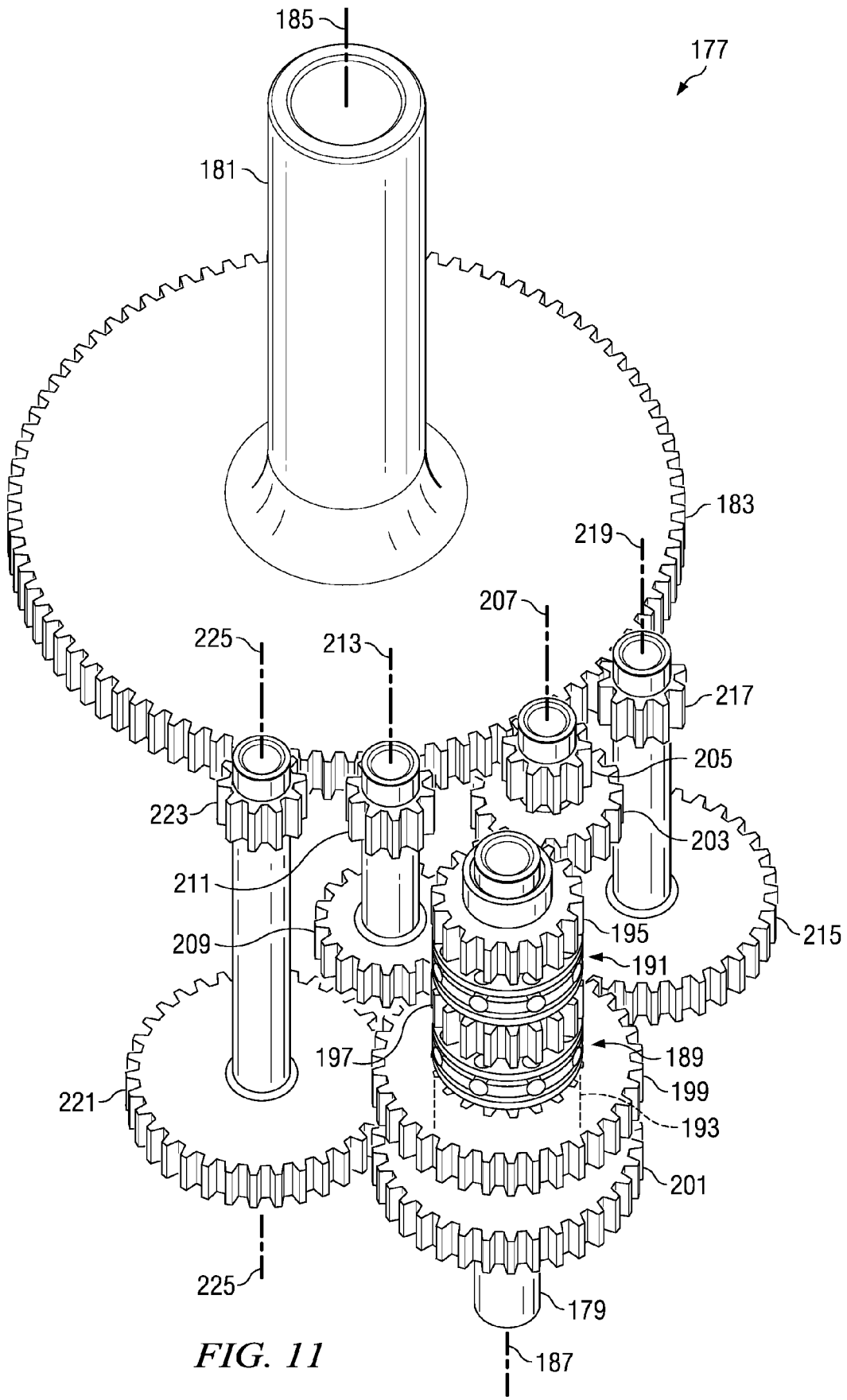
FIG. 11 is an oblique view of an alternative embodiment of the transmission according to the present invention.

FIG. 11 illustrates transmission 177, which is another alternative embodiment according to the present invention. Transmission 177 has a 1-into-4 configuration for transferring torque from input shaft 179 to a mast 181. Mast 181 has an integral bull gear 183 and rotates about axis 185. Input shaft 179 rotates about axis 187 and drives a differential 189, which splits the torque from input shaft 179. Each of the two sides of differential 189 is connected to a coaxial differential 191, 193 (differential 193 being shown in phantom) for again splitting the torque. Differential 191 is located between drive gears 195, 197, and each of the two sides of differential 191 drives one of gears 195, 197. Differential 193 is located between drive gears 199, 201, and each of the two sides of differential 193 drives one of gears 199, 201. Drive gear 195 drives an intermediate gear 203 and attached output gear 205 about axis 207, and output gear 205 engages bull gear 183 for transferring torque to bull gear 183. Likewise, drive gear 197 drives intermediate gear 209 and attached output gear 211 about axis 213, drive gear 199 drives intermediate gear 215 and attached output gear 217 about axis 219, and drive gear 201 drives intermediate gear 221 and attached output gear 223 about axis 225. Output gears 205, 211, 217, 223 also engage bull gear 183 for transferring torque to bull gear 183.

Figure 12:
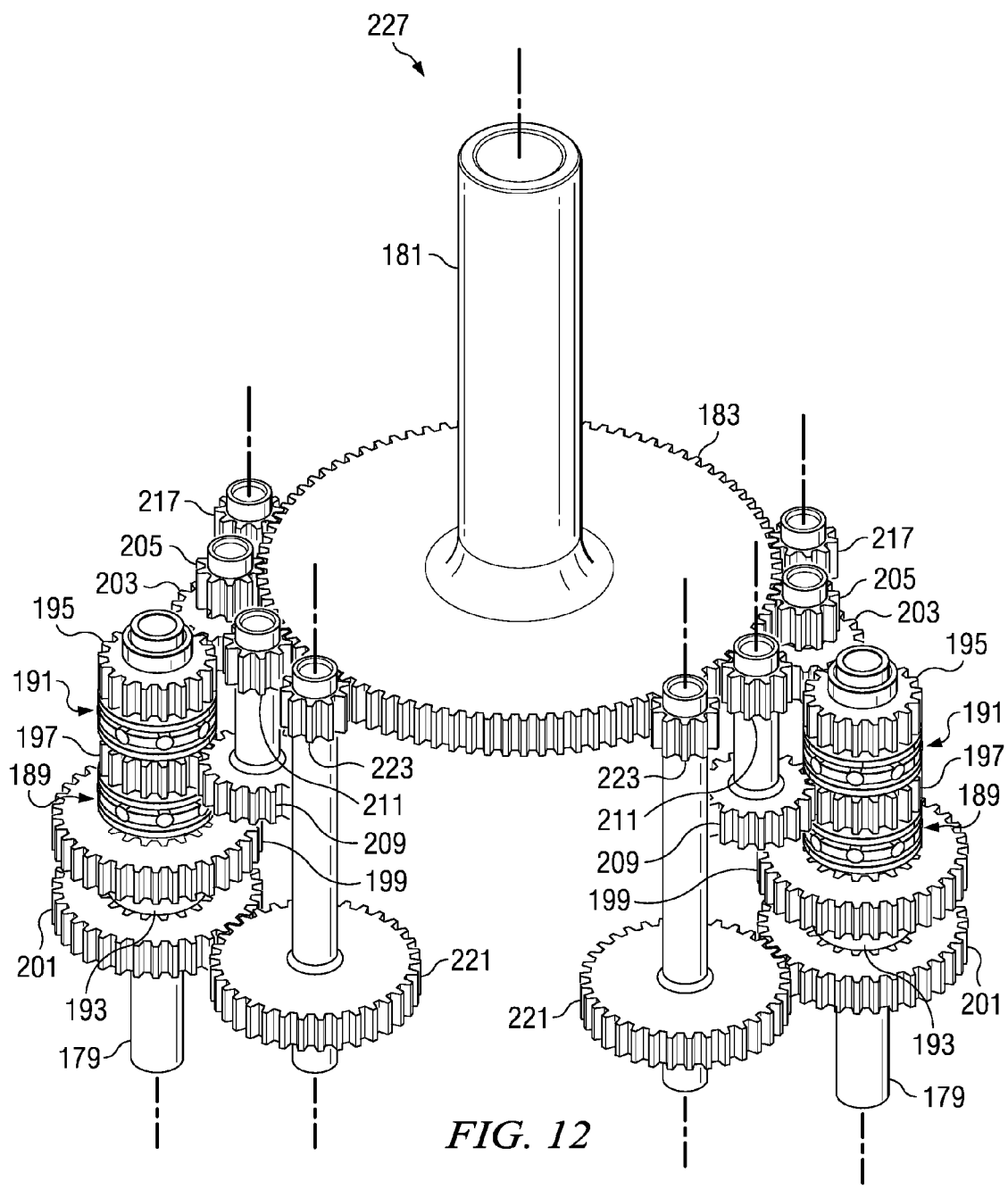
FIG. 12 is an oblique view of an alternative embodiment of the transmission according to the present invention.

Transmission 227, shown in FIG. 12, uses the same components and torque paths as transmission 177, providing a 2-into-8 configuration for transferring torque from two input shafts 179 to bull gear 183. Each input shaft 179 drives four output gears 205, 211, 217, 223 through a torque-splitting differential arrangement, in which differential 189 splits the torque from input shaft 179, and then the output from differential 189 is split by differentials 191, 193.

It is apparent that an invention with significant advantages has been described and illustrated. Although the present invention is shown in a limited number of forms, it is not limited to just these forms, but is amenable to various changes and modifications without departing from the spirit thereof. For example, the embodiments are shown with selected gear ratios, though other gear ratios may alternatively be used in one or more of the gear sets of each embodiment.

The invention claimed is:

1. A transmission for a rotary-wing aircraft, the transmission comprising:
    a differential torque-splitting mechanism adapted for interfacing with a shaft about a longitudinal shaft axis of rotation, the differential torque-splitting mechanism comprising:
        a drive disk coaxial with the longitudinal shaft axis of rotation and adapted to be in rotation with the shaft;
        a first driven member coaxial with the longitudinal shaft axis of rotation and generally adjacent the drive disk;
        a second driven member coaxial with the longitudinal shaft axis of rotation and generally adjacent the drive disk; and
        a plurality of pin members, each pin member pivotally engaging the drive disk at a central portion of the pin member, each pin member pivotally engaging the first driven member at a first end portion of the pin member, and each pin member pivotally engaging the second driven member at a second end portion of the pin member;
    wherein the first driven member is configured to drive a first transfer gear and the second driven member is configured to drive a second transfer gear.

2. The transmission according to claim 1, further comprising:
    a first bull gear; and
    a second bull gear;
    wherein the first transfer gear engages the first bull gear and the second bull gear engages the first bull gear.

3. The transmission according to claim 1, further comprising:
    a first bull gear;
    wherein the first transfer gear and the second transfer gear both transfer torque to the first bull gear.

4. The transmission according to claim 1, each pin member further comprising:
    a first ball joint at the first end portion; and
    a second ball joint at the second end portion.

5. The transmission according to claim 1, each pin member further comprising:
    a central cylindrical joint at the central portion;
    wherein the central cylindrical joint pivotally engages the drive disk;
    wherein the at least one pin is configured for translation along the central cylindrical joint axis.

6. The transmission according to claim 1, each pin member further comprising:

a central cylindrical joint axis defined by a central joint at the central portion;
wherein the central cylindrical joint axis is substantially radial to the longitudinal shaft axis of rotation.

7. The transmission according to claim 1, each pin member further comprising:
a first ball joint at the first end portion;
a second ball joint at the second end portion; and
a third ball joint at the central portion.

8. The transmission according to claim 1, each pin member further comprising:
an elongated joint, wherein a longitudinal axis of the elongated joint is disposed generally radial to the shaft axis.

9. The transmission according to claim 1, wherein the distance between the first driven member and the drive disk is not equal to the distance between the second driven member and the drive disk, such that torque is unevenly distributed between a first drive path associated with the first driven member and a second drive path associated with the second driven member.

10. The transmission according to claim 1, wherein the shaft is an input shaft carrying torque from an engine.

11. A transmission for a rotary-wing aircraft, the transmission comprising:
a central differential torque-splitting mechanism adapted for interfacing with an input shaft about a shaft axis of rotation, the central differential torque-splitting mechanism comprising:
a central drive disk coaxial with the shaft axis of rotation and adapted to be in rotation with the input shaft;
a first central driven member coaxial with the shaft axis of rotation and generally adjacent the central drive disk;
a second central driven member coaxial with the shaft axis of rotation and generally adjacent the drive disk; and
a plurality of central pin members, each central pin member pivotally engaging the central drive disk at a central portion of the central pin member, each central pin member pivotally engaging the first central driven member at a first end portion of the central pin member, and each central pin member pivotally engaging the second central driven member at a second end portion of the central pin member;
an upper differential torque-splitting mechanism adapted for interfacing with the central differential torque-splitting mechanism about the shaft axis of rotation, the upper differential torque-splitting mechanism comprising:
an upper drive disk coaxial with the shaft axis of rotation and adapted to be in rotation with the first central driven member of the central differential torque-splitting mechanism;
a first upper driven member coaxial with the shaft axis of rotation and generally adjacent the upper drive disk;
a second upper driven member coaxial with the shaft axis of rotation and generally adjacent the upper drive disk; and
a plurality of upper pin members, each upper pin member pivotally engaging the upper drive disk at a central portion of the upper pin member, each upper pin member pivotally engaging the first upper driven member at a first end portion of the upper pin member, and each upper pin member pivotally engaging the second upper driven member at a second end portion of the upper pin member;
a lower differential torque-splitting mechanism adapted for interfacing with the central differential torque-splitting mechanism about the shaft axis of rotation, the lower differential torque-splitting mechanism comprising:
a lower drive disk coaxial with the shaft axis of rotation and adapted to be in rotation with the second central driven member of the central differential torque-splitting mechanism;
a first lower driven member coaxial with the shaft axis of rotation and generally adjacent the lower drive disk;
a second lower driven member coaxial with the shaft axis of rotation and generally adjacent the lower drive disk; and
a plurality of lower pin members, each lower pin member pivotally engaging the lower drive disk at a central portion of the lower pin member, each lower pin member pivotally engaging the first lower driven member at a first end portion of the lower pin member, and each lower pin member pivotally engaging the second lower driven member at a second end portion of the lower pin member.

12. The transmission according to claim 11, the transmission further comprising:
a bull gear.

13. The transmission according to claim 12, the transmission further comprising:
a first drive gear configured for transferring torque from the first upper driven member to the bull gear.

14. The transmission according to claim 13, the transmission further comprising:
a second drive gear configured for transferring torque from the second upper driven member to the bull gear.

15. The transmission according to claim 14, the transmission further comprising:
a third drive gear configured for transferring torque from the first lower driven member to the bull gear.

16. The transmission according to claim 15, the transmission further comprising:
a fourth drive gear configured for transferring torque from the second lower driven member to the bull gear.

17. The transmission according to claim 13, the transmission further comprising:
a first output gear coupled to the first drive gear, the first output gear being engaged with the bull gear.

18. The transmission according to claim 14, the transmission further comprising:
a second output gear coupled to the second drive gear, the second output gear being engaged with the bull gear.

19. The transmission according to claim 15, the transmission further comprising:
a third output gear coupled to the third drive gear, the third output gear being engaged with the bull gear.

20. The transmission according to claim 16, the transmission further comprising:
a fourth output gear coupled to the fourth drive gear, the fourth output gear being engaged with the bull gear.

* * * * *